United States Patent [19]
Lemoine et al.

[11] Patent Number: 5,805,080
[45] Date of Patent: *Sep. 8, 1998

[54] BEARING WITH AN ELECTRIC-ACOUSTIC TRANSDUCER FOR TRANSMITTING INFORMATION REGARDING VARIOUS PARAMETERS WITHIN THE BEARING

[75] Inventors: Richard L. Lemoine, Collinsville; Richard W. Browner, Waterbury; John K. Pearson, Avon; Mark I. Jurras, III, Canton Center, all of Conn.

[73] Assignee: The Torrington Company, Torrington, Conn.

[ * ] Notice: The term of this patent shall not extend beyond the expiration date of Pat. No. 5,602,539.

[21] Appl. No.: 705,391

[22] Filed: Aug. 30, 1996

Related U.S. Application Data

[63] Continuation-in-part of Ser. No. 518,086, Aug. 22, 1995, Pat. No. 5,602,539.

[51] Int. Cl.⁶ .................................................. G08C 21/00
[52] U.S. Cl. .................................. 340/870.16; 340/870.3; 340/682; 384/448
[58] Field of Search ......................... 340/870.16, 870.17, 340/870.26, 870.3, 682; 384/448; 367/135, 137

[56] References Cited

U.S. PATENT DOCUMENTS

| | | | |
|---|---|---|---|
| 2,983,556 | 5/1961 | Coan . | |
| 4,939,920 | 7/1990 | Stahl et al. | 72/237 |
| 5,074,677 | 12/1991 | Andree et al. | 384/448 |
| 5,125,845 | 6/1992 | Benktander et al. | 439/16 |
| 5,145,379 | 9/1992 | Benktander et al. | 439/34 |

FOREIGN PATENT DOCUMENTS

| | | |
|---|---|---|
| 0 413 119 | 2/1991 | European Pat. Off. . |
| WO 89/12528 | 12/1989 | WIPO . |
| WO-A-9413968 | 6/1994 | WIPO . |

OTHER PUBLICATIONS

Mesures Regulation Automatisme, vol. 40, No. 11, Nov. 1975, Paris Fr, pp. 60–62, XP002019100,Carballeira E.A.; "Mesure des Temperatures dans les Machines Electriques".

*Primary Examiner*—Jeffery Hofsass
*Assistant Examiner*—Andrew Hill
*Attorney, Agent, or Firm*—John C. Bigler

[57] ABSTRACT

A bearing is mounted within a housing having an acoustic-electric transducer mounted on its outside. A stationary annular outer race has at least one sensor, an electric-acoustic transducer, and an electronic system interconnecting the sensor and the electric-acoustic transducer. The electric-acoustic transducer is mounted in an opening extending radially through the stationary race. The electric-acoustic transducer has an elastic cap pressed into the inside of the housing by a spring. An alternative configuration, having at least one sensor mounted on a rotatable inner race, without a hard-wired connection through the bearing housing, is also disclosed.

11 Claims, 3 Drawing Sheets

BEARING WITH AN ELECTRIC-ACOUSTIC TRANSDUCER FOR TRANSMITTING INFORMATION REGARDING VARIOUS PARAMETERS WITHIN THE BEARING

This is a continuation-in-part application of application Ser. No. 08/518,086, filed Aug. 22, 1995, now U.S. Pat. No. 5,602,539.

BACKGROUND OF THE INVENTION

This invention relates to bearings. More particularly, this invention is a bearing having an electric-acoustic transducer which receives electric signals indicating various parameters within the bearing and converts the electric signals into acoustic signals.

There are numerous bearing applications where the bearing is mounted in a housing that denies access to the bearing by servicing personnel. There are bearing performance characteristics that are best measured from inside the bearing for a number of different reasons. For instance, temperature-measurement devices are more responsive the closer they are to the source of heat generation. Vibration monitors are less affected by noise if they are installed inside the bearing. In using both of these types of sensors, a more reliable measurement is obtained if the sensor is permanently mounted within the bearing eliminating installation differences and misapplication of the sensor.

Furthermore, in applications where the bearing is transferred to a number of different locations during its life, the ability to maintain the historical data pertaining to an individual bearing is of great advantage in diagnosing bearing conditions.

In many bearing applications, the location that is most sensitive to measurements of critical operating parameters, such as load, temperature, vibration and temperature for example, is on the inner race, since the highest loads and temperatures are found there. Therefore, a system that can monitor bearing conditions on the inner race would be of particular value in such bearing applications.

While better measurements are obtained from within the bearing, the information must be made available to the personnel responsible for servicing the bearing for this information to be useful in diagnosing problems occurring in the bearing and surrounding equipment. Therefore, only if a method can be devised to relay this information out of the bearing will a measurement taken inside the bearing be of value.

The foregoing illustrates limitations known to exist in present devises and methods. Thus, it is apparent that it would be advantageous to provide an alternative directed to overcoming one or more of the limitations set forth above. Accordingly, a suitable alternative is provided including features more fully disclosed hereinafter.

In one aspect of the present invention, this is accomplished by providing a system for monitoring the condition of a bearing. The system includes sensor means mounted on one of the stationary and rotatable races for sensing at least one parameter indicating the condition of the bearing. Electronic means mounted on said one race converts a signal generated by the sensor means to a modulated signal. Transmitting transducer means carried by said one race converts the modulated signal into an acoustic signal transmitted to a solid object. Receiving transducer means carried by the solid object and spaced from the transmitting transducer means receives the acoustic signal and converts it to an electric signal.

SUMMARY OF THE INVENTION

In another aspect of the invention, this is accomplished by providing a bearing adapted to be mounted within a housing having an acoustic-electric transducer mounted on its outside. The bearing comprises an annular rotatable race, an annular stationary race having a greater inside diameter than the outside diameter of the annular rotatable race, and a plurality of rollers located in the annular space between the races. At least one electric-acoustic transducer is mounted on the annular stationary race. The transducer has an elastic portion adapted to contact the housing to maximize the acoustic interface between the electric-acoustic transducer and the housing. Means are provided for pressing the elastic portion against the housing.

In a further aspect of the present invention, this is accomplished by providing a system for monitoring the condition of a bearing having a rotatable inner race and mounted on a shaft. The system includes sensor means mounted on the rotatable inner race for sensing at least one parameter indicating the condition of the bearing. Electronic means on the rotatable inner race converts a signal generated by the sensor means to a modulated signal. Transmitting transducer means movably mounted on the rotatable inner race and biased against the shaft converts the modulated signal into an acoustic signal transmitted to the shaft. Receiving transducer means rotatably mounted on an end of the shaft receives the acoustic signal from the shaft and converts it to an electric signal.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the various figures, like parts are referred to by like numbers.

Figure 1:
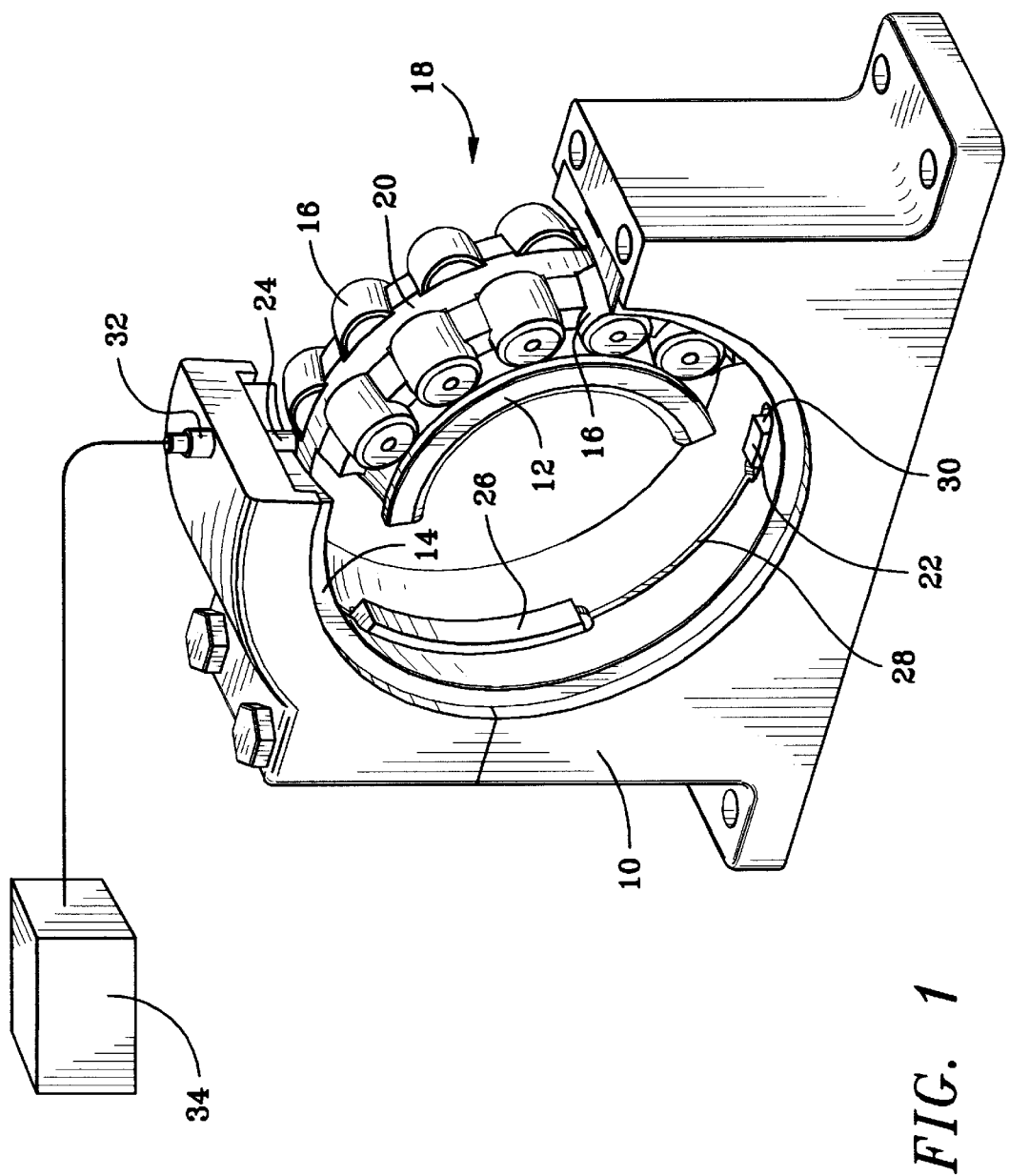
FIG. 1 is a pictorial view of a housed bearing, with portions of the housing removed and portions of the inner race of the bearing removed in order to better illustrate the invention.

Referring to the drawings, and more particularly to FIG. 1, a housing 10 of the type used for supporting large bearings such as those used in steel mills is shown. A rotatable member 12 is rotatably mounted within the housing 10. As shown in FIG. 1, the rotatable member 12 is a rotatable race; however, it is to be understood that under some circumstances and with some bearings, rather than having a rotatable race, a rotatable shaft could extend entirely through the bore in the housing 10 and the shaft serve as a race. A portion of the annular rotatable race 12 is not shown in FIG. 1 so that the inventive features can be more clearly shown.

An annular stationary race 14 is also mounted within the housing 10. The race 14 has a greater inside diameter than the outside diameter of the race 12. A plurality of rollers 16 are located in the annular space between the race 12 and the race 14.

The rollers 16 are mounted within the roller pockets of the roller cage 18. The annular ring 20 of the annular cage 18 separates the rollers 16 into two axially spaced series of rollers.

A sensor 22 is located on the inside surface of the stationary annular race 14. In the drawings, one sensor is shown. However, the actual number of sensors is dependent on how much resolution is wanted and also on the size and length of the bearing and area to be sensed by the sensor. However, of course, at least one sensor must be used.

An electric-acoustic transducer 24 is located in the annular stationary race 14. The electric-acoustic transducer 24 is adapted to transmit acoustic signals through the housing 10. The acoustic signals are related to the parameter within the bearing.

The electronic system 26 interconnects the sensor 22 and the electric-acoustic transducer 24. In the embodiment shown in FIG. 1, a groove 28 extends partially around the inside surface of the stationary annular race 14. However, if desired, the groove may extend around the entire inside surface of the stationary annular race 14 for lower manufacturing costs. That part of the groove which extends from the electronic system 26 to the electric-acoustic transducer 24 is not shown in FIG. 1 because it is hidden by the stationary race 14. The sensor 22 is located in the pocket 30 in the inside surface of the stationary annular race 14. Wires extend along the groove 28 from the sensor 22 to the electronic system 26. Wires also extend from the electronic system 26 to the electric-acoustic transducer 24.

An acoustic-electric transducer 32 is mounted on the outside surface of the housing 10. In the embodiment shown the acoustic-electric transducer 32 is in-line with and radially spaced from the electric-acoustic transducer 24. Thus, the acoustic waves from the electric-acoustic transducer 24 are directly fed to the acoustic-electric transducer 32. The acoustic-electric transducer 32 is adapted to receive the acoustic signals transmitted by the electric-acoustic transducer 24 and convert these acoustic signals into electric signals related to the parameter within the bearing. The signals from the acoustic-electric transducer 32 are fed to the electronic system 34 which converts the output from the acoustic-electric transducer 32 into a value that will indicate the parameter within the bearing.

The word "parameter" as used in this description and in the claims is meant to include any value within the bearing which can be sensed electrically and the electric signals converted into corresponding acoustic signals. These values include, but are not limited to, temperatures, vibration, and load carried by the bearing.

Figure 2:
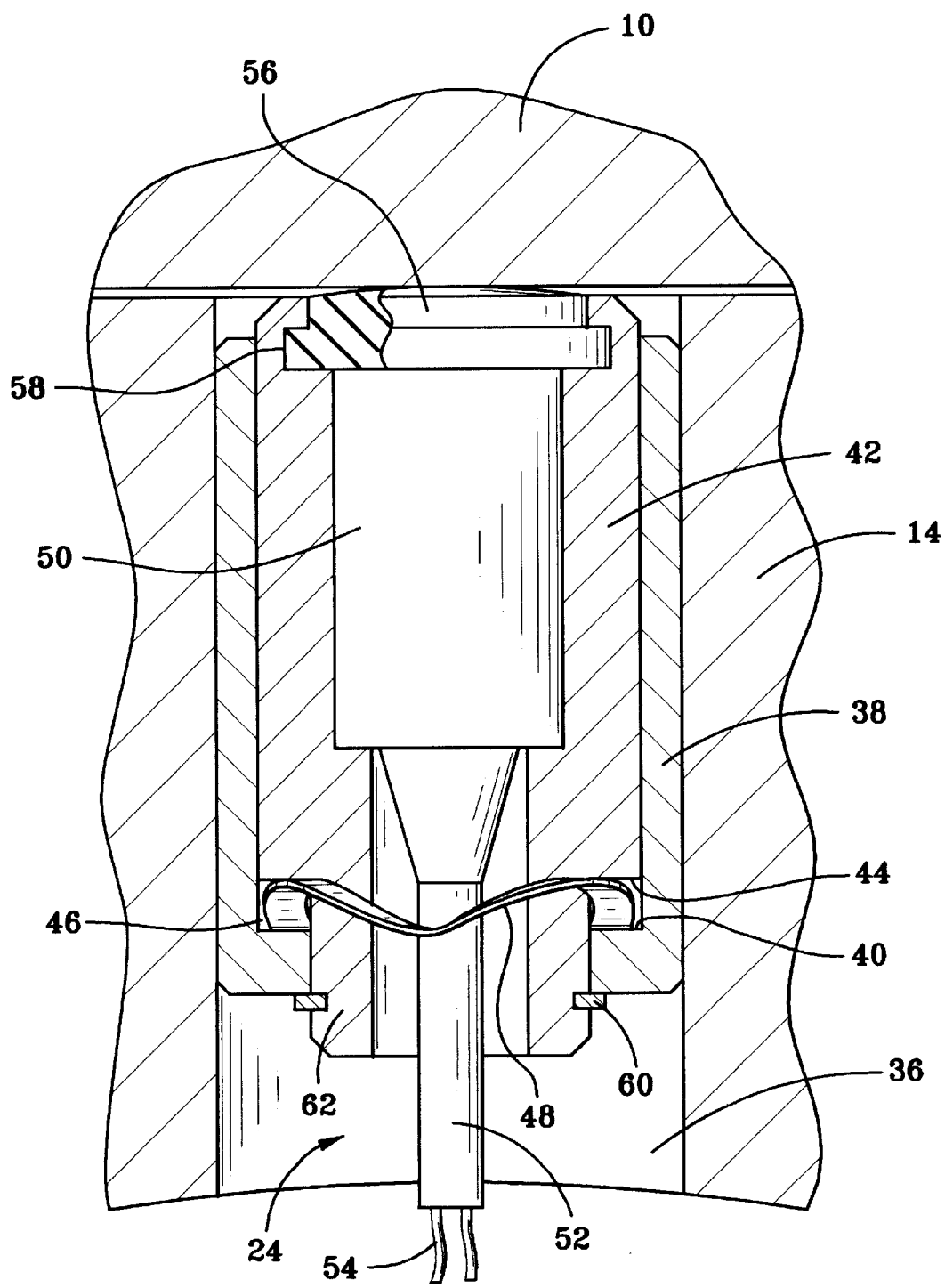
FIG. 2 is a cross-sectional view of one preferred embodiment of the electric-acoustic transducer of the invention.

Referring to FIG. 2, the stationary race 14 has at least one cylindrical opening 36 extending radially from its inside surface to its outside surface. The electric-acoustic transducer 24 is mounted in the cylindrical opening 36. The electric-acoustic transducer has a cylindrical bushing 38. An annular upwardly facing shoulder 40 is located at the bottom of the bore of the bushing.

A sleeve 42 is mounted in the cylindrical bushing 38. The sleeve 42 has an annular downwardly facing shoulder 44 which is spaced above the bushing upwardly facing shoulder 40. This provides an annular recess 46. A wave spring 48 is mounted in the annular recess 46.

A cylindrical member 50 which contains a piezoelectric crystal is mounted in the sleeve 42. Member 50 receives the electric signals from the parameter sensing system through wires 54 and converts the electric signals into corresponding acoustic signals. Stem 52 is a potted compound that provides strain relief for the wires 54. The piezoelectric crystal included in the cylindrical member 50 may be any suitable crystal which undergoes mechanical deformation when an electrical field is applied on certain faces of the crystal. Suitable crystals include, but are not limited to, quartz, barium titanate, zirconate titanate, and lead.

An elastic or elastomeric cap 56 is mounted in the top of the sleeve 42. The sleeve is provided with an annular groove in which the larger diameter portion 58 of the cap 56 is fitted. The top of the cap 56 extends upwardly beyond the top of the sleeve 42 in order to be adapted to contact the inside of the housing 10.

The bottom of the cap 56 is in continuous contact with the top of member 50. Thus the arrangement of the cap 56 and the member 50 is such that the acoustic interface between the member 50 and the inside of the housing 10 is maximized.

A snap ring 60 is mounted within an annular groove around the smaller diameter portion 62 of the sleeve 42. This smaller diameter portion extends below the bottom of the bushing 38. The wave spring 48 wraps around the smaller diameter portion 62 of the sleeve 42. Wave spring 48 applies a force against the downwardly facing shoulder 44 of the sleeve 42 to press the elastic cap 56 against the inside surface of the housing 10.

Figure 3:
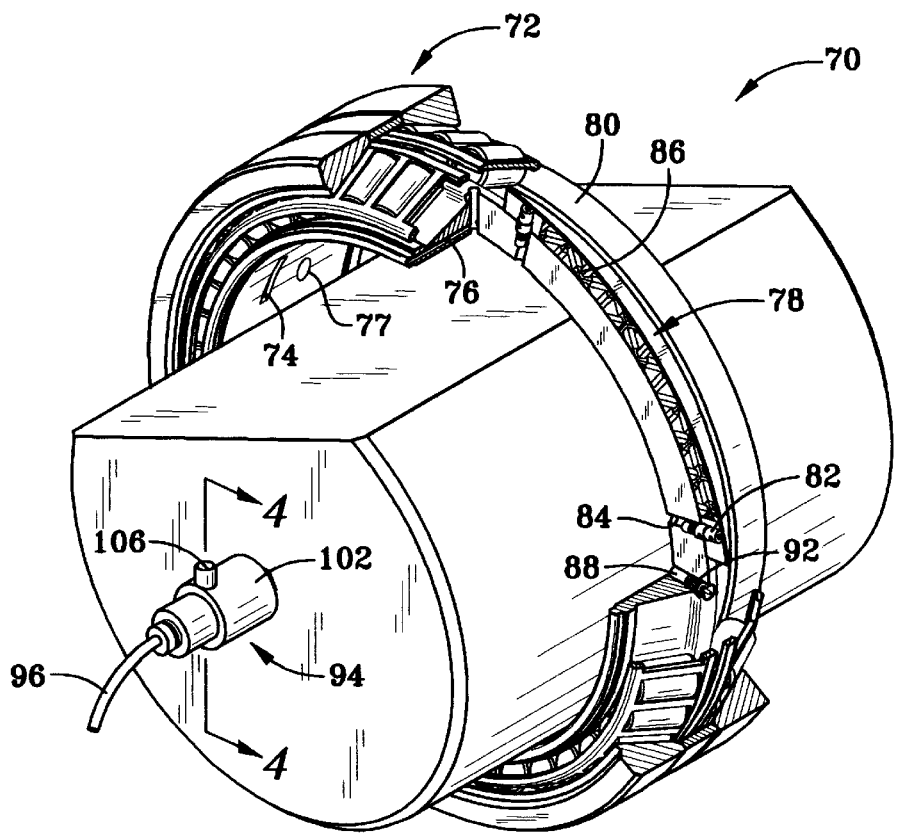
FIG. 3 is a pictorial view of a shaft and a bearing, with portions of the shaft and bearing removed to better illustrate a further embodiment of the present invention.

FIG. 3 illustrates system 70, a further embodiment of the present invention, for monitoring the condition of bearing 72. System 70 includes at least one sensor means, such as strain gage 74, temperature sensor 76, or accelerometer 77 for example, electronics package 78, and electric-acoustic means for transmitting measured data out of bearing 72. Bearing 72 may be a large roller bearing suitable for use in a steel mill or other type of bearing.

In the preferred embodiment illustrated, temperature sensors 76 are resistive temperature devices (RTDs). An RTD is essentially a precision resistor with a known and repeatable relationship between the temperature of the device and its measured resistance. Other known sensors for measuring temperature, strain, vibration, speed, and other parameters of bearing condition may also be used. The sensors are mounted on, or in recesses within, inner race 80 of bearing 72.

Electronics package 78 is mounted on inner race 80 and includes circuitry to excite the RTD and/or other sensor(s), to convert the measured data to a modulated signal and to drive the transmission hardware described below. In the embodiment illustrated in FIG. 3, electronics package 78 includes a crescent shaped circuit board mounted "on edge" by anchor pins 82 that engage and extend outwardly from radial holes 84 of inner race 80.

The circuitry of electronics package 78 is of a known type and is dependent upon the type of sensors used. Placement of the circuitry and the type of packaging depends on the size and type of bearing 72. For example, the double row bearing illustrated provides ideal space between the rows of rollers. Electronics package 72 is electrically connected to the sensor(s) and electric-acoustic means by wires that may be mounted within grooves or other recesses within inner race 80.

A modulation scheme is used to code the data for transmission. The preferred method of coding modulates the transmission frequency between two values to provide a digital representation of the data being transmitted. In this way, the amplitude of the transmitted pulses need not be controlled, and the signal will not be disturbed by changes in signal strength and noise present in the bearing at the transmission carrier frequency. The carrier frequency may be selected high enough to avoid background noise. Alternatively analog frequency modulation may be used to code the data being transmitted.

Power is provided to electronics package 78 by energy storage cell 86 or other means. Energy storage cell 86 may be a battery mounted on the circuit board holding the circuitry or otherwise mounted to permit convenient replacement when system 70 is serviced.

The electric-acoustic means for transmitting the measured data out of bearing 72 includes transmitting transducer 88 mounted within a recess of inner race 80, facing shaft 90 over which inner race 80 is mounted. A spring or other biasing means 92 forces the transducer, covered by a thin sheet of elastomeric polymer, against shaft 90. The polymer provides a suitable interface allowing an acoustic signal to enter the shaft without excessive attenuation or reflectance.

Once the acoustic signal enters shaft 90, it will be transmitted faithfully along its length due to the favorable propagation properties of steel or other shaft material. The acoustic signal is transferred off the shaft through fluid-filled rotating union 94 that is fixed to an end of shaft 90 at its axis by a threaded stud, a magnet, an adhesive or other means. Coaxial cable 96 can be wired directly to an electronics package mounted in a location that is accessible to the user.

Figure 4:
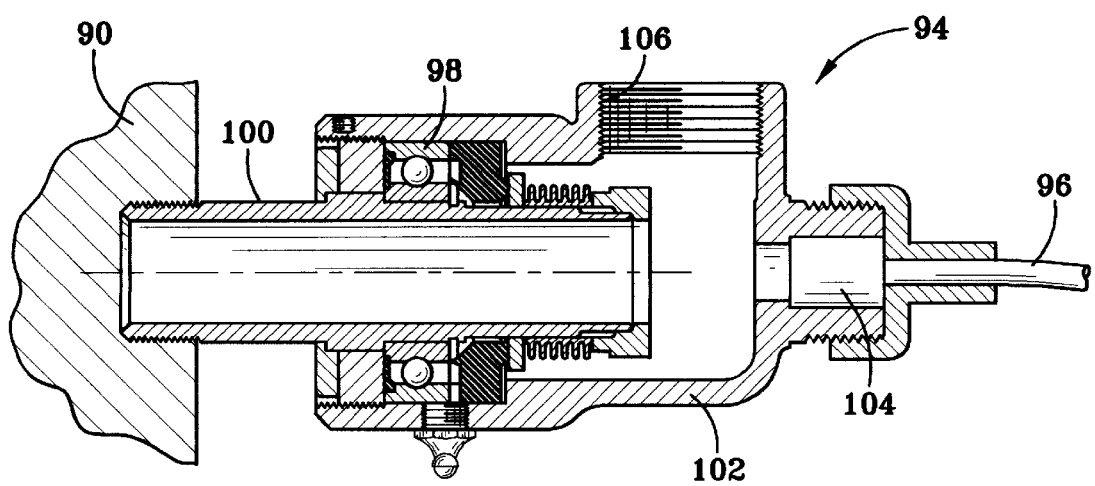
FIG. 4 is a sectional view of an acoustic-electric transducer and rotary union of the embodiment of FIG. 3, along the line 4—4 of FIG. 3.

Details of rotating union 94 are illustrated in FIG. 4. Sealed radial bearing 98 allows relative rotation of threaded tube 100 and housing 102. Fluid within threaded tube 100 and housing 102 provides an interface and faithfully transmits the acoustic signal to receiving transducer 104. Receiving transducer 104 may be wired via coaxial cable 96 to electronic circuitry that demodulates the acoustic signal and converts it to engineering units to be displayed or logged by data acquisition hardware at the user's site. Threaded port 106 may be used to fill or bleed the fluid.

From the above description, it will be apparent that the present invention provides a system that can measure conditions at either the inner or outer race of a bearing and transmit measured data without a hard-wired connection through the bearing housing. This invention permits more reliable measurement of bearing condition than systems that are only temporarily installed or that have sensors that are not as close to the source of heat generation or load-bearing members.

Having described the invention, what is claimed is:

1. A system for monitoring the condition of a bearing having a stationary race and a rotatable race, the system comprising:

sensor means mounted on one of the stationary and rotatable races for sensing at least one parameter indicating the condition of the bearing;

electronic means mounted on said one race for converting a signal generated by the sensor means to a modulated signal;

transmitting transducer means carried by said one race for converting the modulated signal from the electronic means into an acoustic signal transmitted to a solid object; and receiving transducer means carried by the solid object and spaced from the transmitting transducer means for receiving the acoustic signal from the solid object and converting it to an electric signal.

2. The system according to claim 1, further comprising second electronic means for demodulating the electric signal of the receiving transducer means for display in engineering units to indicate the parameter indicating the condition of the bearing.

3. The system according to claim 1, wherein the solid object is a housing within which the bearing is mounted, and wherein the sensor means, and electronic means are mounted on the outer race and the transmitting transducer means is carried by the outer race.

4. The system according to claim 1, wherein the solid object is a shaft over which the inner race is mounted and wherein the sensor means, and electronic means are mounted on the inner race and the transmitting transducer means is carried by the inner race.

5. The system according to claim 4, wherein the receiving transducer means includes a rotary union mounted on an end of the shaft at the axis of the shaft.

6. The system according to claim 1, wherein the sensor means includes a temperature sensor.

7. The system according to claim 1, wherein the sensor means includes a strain gage.

8. The system according to claim 1, wherein the sensor means includes an accelerometer.

9. The system according to claim 1, wherein the transmitting transducer means is biased against the solid object and includes an elastomeric polymer providing an interface.

10. The system according to claim 1, wherein the receiving transducer means is rotatably mounted on the solid object and includes a fluid providing an interface.

11. A system for monitoring the condition of a bearing having a rotatable inner race mounted on a shaft, the system comprising:

sensor means mounted on the rotatable inner race for sensing at least one parameter indicating the condition of the bearing;

electronic means mounted on the rotatable inner race for converting a signal generated by the sensor means to a modulated signal;

transmitting transducer means movably mounted on the rotatable inner race and biased against the shaft for converting the modulated signal from the electronic means into an acoustic signal transmitted to the shaft; and receiving transducer means rotatably mounted on an end of the shaft for receiving the acoustic signal from the shaft and converting it to an electric signal.

* * * * *